(12) United States Patent
Petrucci et al.

(10) Patent No.: US 8,718,868 B2
(45) Date of Patent: May 6, 2014

(54) VEHICLE USING TIRE TEMPERATURE TO ADJUST ACTIVE CHASSIS SYSTEMS

(75) Inventors: Michael G. Petrucci, Holly, MI (US); Alexander J. MacDonald, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 217 days.

(21) Appl. No.: 13/173,577

(22) Filed: Jun. 30, 2011

(65) Prior Publication Data

US 2013/0006440 A1    Jan. 3, 2013

(51) Int. Cl.
 *G06F 7/00* (2006.01)
 *B60G 23/00* (2006.01)
 *B60B 39/00* (2006.01)
 *G05D 1/00* (2006.01)

(52) U.S. Cl.
 USPC .................. 701/36; 701/37; 701/71; 701/82

(58) Field of Classification Search
 None
 See application file for complete search history.

(56) References Cited

U.S. PATENT DOCUMENTS

| | | | |
|---|---|---|---|
| 3,999,430 A | 12/1976 | Parduhn | |
| 4,067,235 A | 1/1978 | Markland et al. | |
| 4,384,482 A | 5/1983 | Snyder | |
| 5,289,160 A | 2/1994 | Fiorletta | |
| 5,541,574 A | 7/1996 | Lowe et al. | |
| 5,562,787 A | 10/1996 | Koch et al. | |
| 5,569,848 A | 10/1996 | Sharp | |
| 6,087,930 A | 7/2000 | Kulka et al. | |
| 6,182,001 B1 | 1/2001 | Sugai et al. | |
| 6,232,875 B1 * | 5/2001 | DeZorzi | 340/442 |
| 6,292,095 B1 | 9/2001 | Fuller et al. | |
| 6,385,511 B1 | 5/2002 | Fondeur et al. | |
| 6,385,553 B1 | 5/2002 | Naito et al. | |
| 6,447,075 B2 * | 9/2002 | Ross et al. | 303/20 |
| 6,456,922 B1 * | 9/2002 | Gamberg | 701/71 |
| 6,597,284 B2 | 7/2003 | Juzswik | |
| 6,672,149 B2 * | 1/2004 | Hottebart et al. | 73/146 |
| 6,879,938 B2 * | 4/2005 | Asano et al. | 702/185 |
| 6,895,317 B2 | 5/2005 | Yasui et al. | |
| 6,907,778 B2 | 6/2005 | Kogure et al. | |
| 6,918,289 B2 * | 7/2005 | Hayashi et al. | 73/146 |
| 6,963,274 B2 * | 11/2005 | Saheki et al. | 340/447 |
| 7,091,840 B2 | 8/2006 | Ichinose | |
| 7,197,922 B2 | 4/2007 | Rimkus et al. | |
| 7,277,816 B2 | 10/2007 | Kanekawa et al. | |
| 7,497,305 B2 * | 3/2009 | Miller et al. | 188/1.11 E |
| 7,541,919 B1 | 6/2009 | Huang | |
| 7,546,764 B2 * | 6/2009 | Morinaga et al. | 73/146 |
| 7,725,235 B2 * | 5/2010 | Fandard et al. | 701/71 |

(Continued)

*Primary Examiner* — Mussa A Shaawat
(74) *Attorney, Agent, or Firm* — Ingrassia Fisher & Lorenz, P.C.

(57) ABSTRACT

In accordance with exemplary embodiments, a system and method are provided for using tire temperature for dynamically adjusting active chassis systems of a vehicle. The method comprises determining a tire temperature value for at least one tire of a vehicle using at least one sensor and adjusting at least one active chassis system of the vehicle responsive to the tire temperature value. The system comprises a chassis having an engine providing power to tires to propel the vehicle. At least one active chassis system is configured to control braking, power applied or control inputs to the tires, and a controller is configured to determine a tire temperature value for adjusting the at least one active chassis systems. The at least one active chassis systems are adjusted responsive to the tire temperature value provided by the controller to control braking, power applied or control inputs to the tires.

13 Claims, 3 Drawing Sheets

(56) References Cited

U.S. PATENT DOCUMENTS

| | | | |
|---|---|---|---|
| 7,739,005 B1* | 6/2010 | Tang | 701/22 |
| 7,747,363 B1* | 6/2010 | Tang | 701/22 |
| 7,778,741 B2* | 8/2010 | Rao et al. | 701/1 |
| 7,839,273 B2* | 11/2010 | Tabe | 340/442 |
| 7,873,449 B2* | 1/2011 | Bujak et al. | 701/33.7 |
| 7,901,014 B2* | 3/2011 | Miller et al. | 303/191 |
| 7,912,683 B2* | 3/2011 | Miyashita et al. | 703/2 |
| 8,087,301 B2* | 1/2012 | Hammerschmidt et al. | 73/800 |
| 8,125,323 B2* | 2/2012 | Stephan et al. | 340/447 |
| 8,374,748 B2* | 2/2013 | Jolly | 701/37 |
| 8,375,781 B2* | 2/2013 | Paul et al. | 73/170.02 |
| 2002/0075146 A1* | 6/2002 | Saheki | 340/447 |
| 2002/0095253 A1* | 7/2002 | Losey et al. | 701/71 |
| 2002/0095980 A1* | 7/2002 | Breed et al. | 73/146 |
| 2002/0124637 A1 | 9/2002 | Saheki et al. | |
| 2003/0006890 A1* | 1/2003 | Magiawala et al. | 340/438 |
| 2003/0058118 A1* | 3/2003 | Wilson | 340/679 |
| 2003/0221481 A1* | 12/2003 | Von Wendorff | 73/146 |
| 2004/0011596 A1* | 1/2004 | Miller et al. | 188/1.11 W |
| 2004/0015312 A1* | 1/2004 | Asano et al. | 702/113 |
| 2005/0030196 A1 | 2/2005 | Harris et al. | |
| 2005/0072224 A1 | 4/2005 | Huang | |
| 2005/0156722 A1* | 7/2005 | McCall et al. | 340/447 |
| 2005/0162263 A1* | 7/2005 | Fennel et al. | 340/442 |
| 2005/0273218 A1* | 12/2005 | Breed et al. | 701/2 |
| 2006/0025897 A1* | 2/2006 | Shostak et al. | 701/1 |
| 2006/0052920 A1* | 3/2006 | Watabe | 701/29 |
| 2006/0077048 A1* | 4/2006 | Saitou et al. | 340/426.33 |
| 2007/0233352 A1* | 10/2007 | Miyashita et al. | 701/82 |
| 2007/0240502 A1* | 10/2007 | Morinaga et al. | 73/146 |
| 2007/0295073 A1* | 12/2007 | Bougeard et al. | 73/146 |
| 2008/0243327 A1* | 10/2008 | Bujak et al. | 701/29 |
| 2008/0252435 A1* | 10/2008 | Chien et al. | 340/438 |
| 2010/0123569 A1* | 5/2010 | Okada et al. | 340/442 |
| 2010/0222953 A1* | 9/2010 | Tang | 701/22 |
| 2010/0256946 A1* | 10/2010 | Carresjo et al. | 702/138 |
| 2010/0271191 A1* | 10/2010 | de Graff et al. | 340/447 |
| 2010/0274441 A1* | 10/2010 | Carresjo | 701/33 |
| 2010/0274607 A1* | 10/2010 | Carresjo et al. | 705/7 |
| 2010/0327653 A1* | 12/2010 | Wygnanski et al. | 303/10 |
| 2011/0231051 A1* | 9/2011 | Gerdin et al. | 701/29 |
| 2012/0041660 A1* | 2/2012 | Killian et al. | 701/70 |
| 2012/0211997 A1* | 8/2012 | Bonisoli et al. | 290/1 R |
| 2013/0009763 A1* | 1/2013 | Koga | 340/442 |
| 2013/0192814 A1* | 8/2013 | Okubo | 165/287 |
| 2013/0241723 A1* | 9/2013 | Tanaka et al. | 340/447 |

\* cited by examiner

VEHICLE USING TIRE TEMPERATURE TO ADJUST ACTIVE CHASSIS SYSTEMS

TECHNICAL FIELD

The technical field generally relates to systems and methodologies for operating active chassis systems for a vehicle, and more particularly, to systems and methodologies for using tire temperature for dynamically adjusting active chassis systems for a vehicle.

BACKGROUND

Contemporary vehicles typically include active chassis systems that enhance vehicle performance and safety by controlling braking, power applied or control inputs to one or more of the vehicle tires. Electronic stability control systems and active driveline coupling control are examples of such active chassis systems. However, to fully optimize performance of these systems variable parameters such as tire temperature must be known. This is particularly true of high performance tires that have been optimized for paved roads (commonly referred to as "HWY4" classified tires). These tires typically have widely varied performance depending upon whether the tire is cold, nominal or hot. These ranges or states are the result of unique phases in which the rubber of the tire can exist depending on temperature rather than a linear relationship between certain characteristics and temperature. Such varying performance can affect the overall peak and sliding longitudinal and lateral traction capabilities of the tire. Consequently, conventional active chassis systems are optimized for a single temperature range (e.g., normal) or a compromise is employed to provide adequate performance over two temperatures ranges (for example, cold and normal).

Accordingly, it is desirable to provide optimized active chassis systems for a vehicle over the entire operating temperature range of the tires. Additionally, other desirable features and characteristics of the present invention will become apparent from the subsequent description taken in conjunction with the accompanying drawings and the foregoing technical field and background.

BRIEF SUMMARY

In accordance with an exemplary embodiment, a method is provided for using tire temperature for dynamically adjusting active chassis systems of a vehicle. The method comprises determining a tire temperature value for at least one tire of a vehicle using at least one sensor and adjusting at least one active chassis system of the vehicle responsive to the tire temperature value.

In accordance with another exemplary embodiment, a system is provided for using tire temperature for dynamically adjusting active chassis systems of a vehicle. The system comprises a chassis having an engine providing power to tires to propel the vehicle. At least one active chassis system is configured to control braking, power applied or control inputs to the tires, and a controller is configured to determine a tire temperature value for adjusting the at least one active chassis systems. The at least one active chassis systems are adjusted responsive to the tire temperature value provided by the controller to control braking, power applied or control inputs to the tires.

DESCRIPTION OF THE DRAWINGS

The subject matter will hereinafter be described in conjunction with the following drawing figures, wherein like numerals denote like elements, and.

DETAILED DESCRIPTION

The following detailed description is merely exemplary in nature and is not intended to limit the subject matter of the disclosure or its uses. Furthermore, there is no intention to be bound by any expressed or implied theory presented in the preceding technical field, background, brief summary or the following detailed description.

The following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-2 are merely illustrative and may not be drawn to scale.

Figure 1:
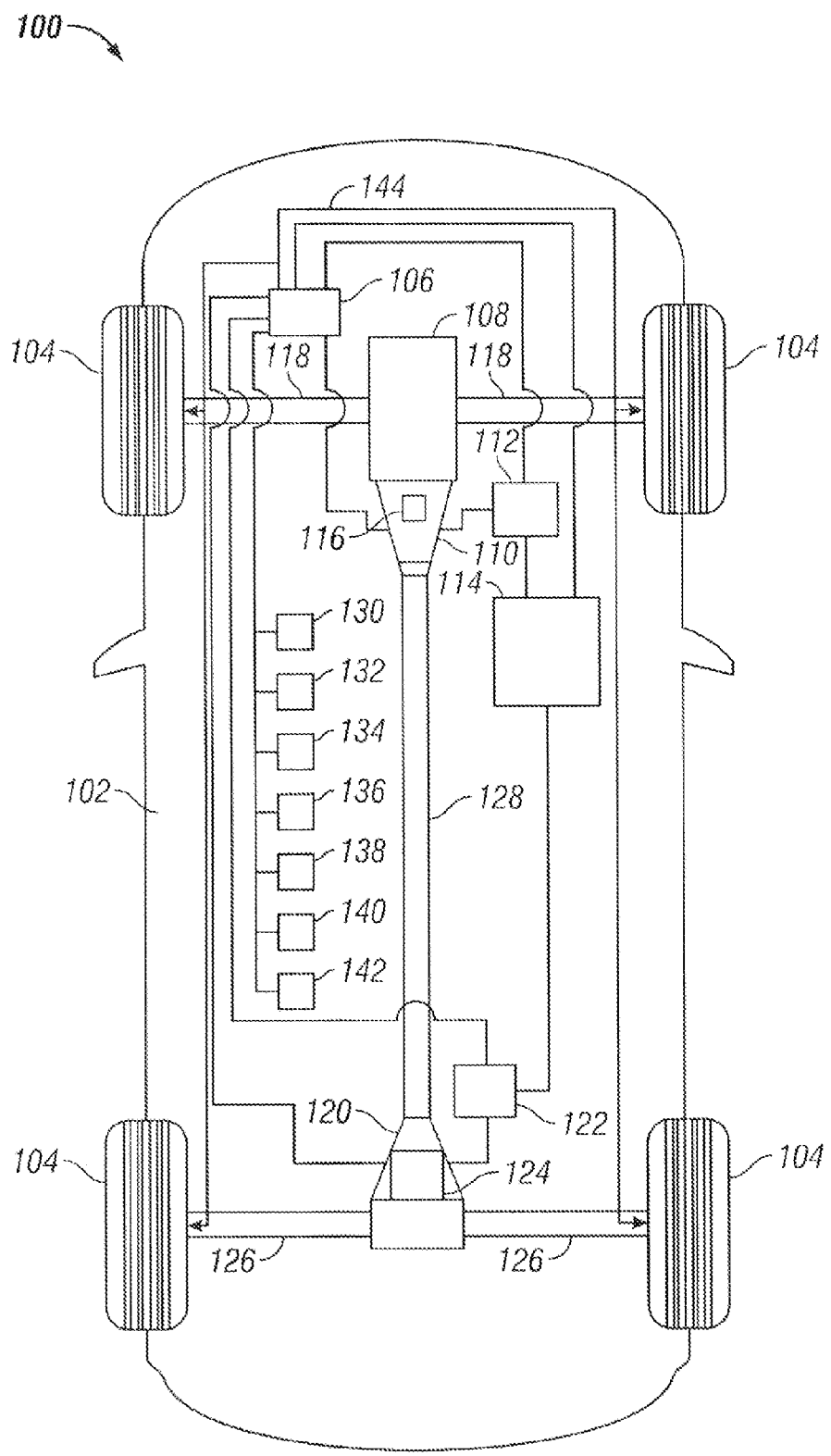
FIG. 1 is an illustration of a vehicle according to an exemplary embodiment.
Figure 2:
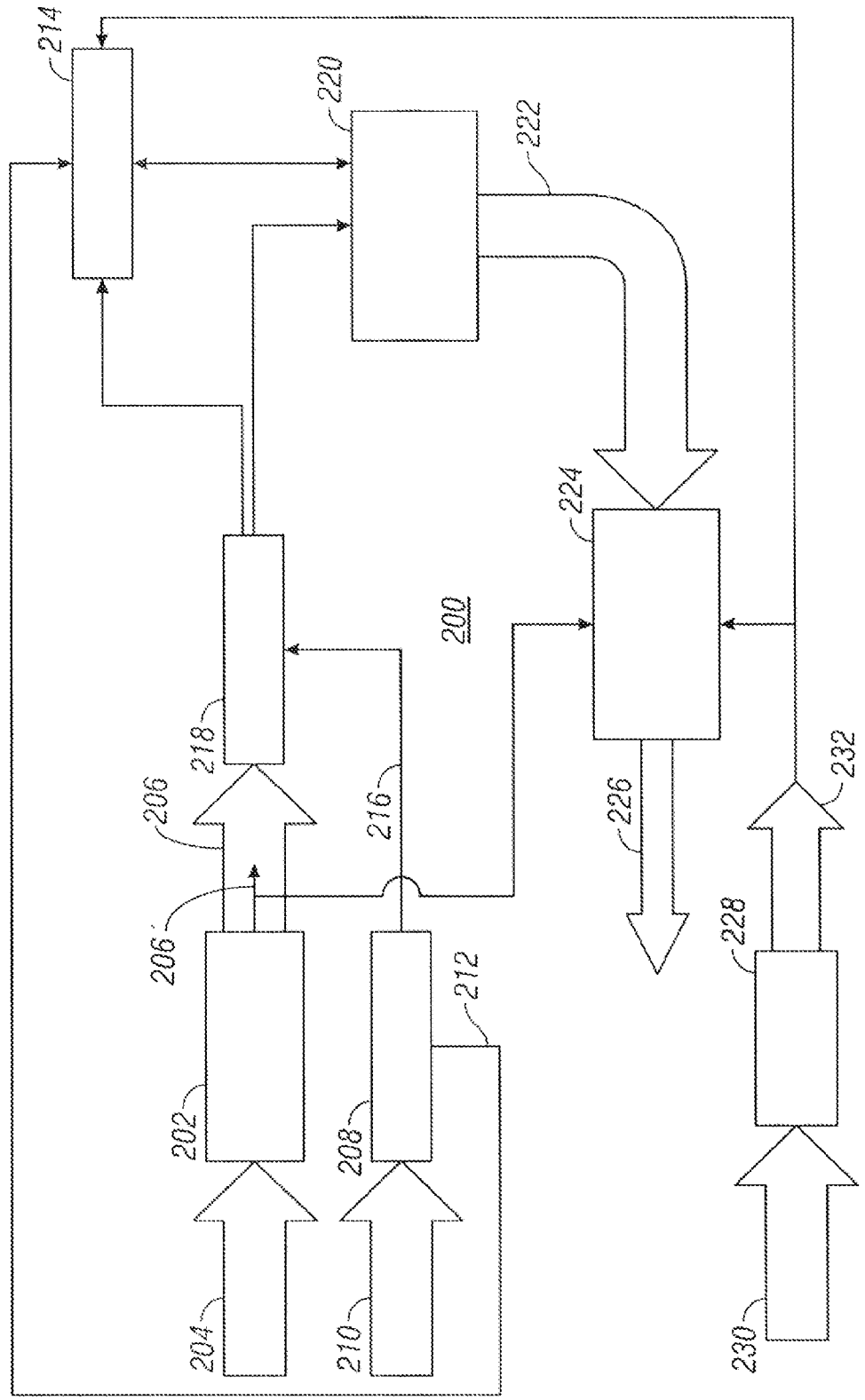
FIG. 2 is a state diagram illustrating the operation of an active chassis control system according to exemplary embodiments.

FIG. 1 illustrates a hybrid electric vehicle 100, according to one embodiment. The vehicle 100 may be any one of a number of different types of vehicle, such as, for example, a sedan, a wagon, a truck, or a sport utility vehicle (SUV), and may be two-wheel drive (2WD), four-wheel drive (4WD), or all-wheel drive (AWD). The vehicle 100 may also incorporate any one of, or combination of, a number of different types of engines, such as, for example, a gasoline or diesel fueled combustion engine, a flex fuel vehicle (FFV) engine (i.e., using a mixture of gasoline and alcohol), a gaseous compound (e.g., hydrogen and/or natural gas) fueled engine, a combustion/electric motor hybrid engine, and an electric motor.

In the exemplary embodiment of FIG. 1, the vehicle 100 includes a frame 102, four wheels 104, and an electronic control system 106. Although not specifically shown, the frame 102 includes a chassis and a body arranged on the chassis that substantially encloses the other components of the vehicle 100. The wheels 104 are each rotationally coupled to the frame 102 near a respective corner. While FIG. 1 depicts various electrical and mechanical connections and couplings in a very simplified manner for ease of description, an actual embodiment of vehicle 100 will of course utilize additional physical components and devices that are well known in the automotive industry.

As illustrated in FIG. 1, the vehicle 100 is a hybrid electric vehicle, and further includes an internal combustion engine 108, a forward motor/transmission assembly 110, a forward power inverter 112 and a battery assembly 114. The forward motor/transmission assembly 110 includes an electric motor 116, which together with the internal combustion engine 108 powers the front wheels 104 via axels 118. The rear of the vehicle 100 includes a rear motor/transmission assembly 120 and a rear power inverter 122 providing power to a rear electric motor 124 that powers the rear wheel 104 via axels 126. Optionally, depending upon the vehicle type, a drive shaft 128 may be used to couple the front motor/transmission assembly 110 to the rear motor/transmission assembly 120.

The electronic control system 106 is in operable communication with a forward motor/transmission assembly 110, the rear motor/transmission assembly 120, the battery 34 and the power inverters 112 and 122. Additionally, the electronic control system 106 communicates with various sensors, engine control modules and active chassis systems that are used for reliable and safe operation of the vehicle 100. As an example, and not a limitation, exemplary active chassis control systems that control braking, power applied or control inputs to the tires include: an antilock braking system 130, a traction control system 132, an electronic stability control system 134, an all wheel drive (e-AWD) system 136, an electronically controlled front, center and rear driveline coupling 138, electronic power steering system 140 and electronic suspension system 142. Other active chassis systems that control braking, power applied or control inputs to the tires are also possible.

According to exemplary embodiments, the controller 106 adjusts, calibrates or optimizes one or more of these active chassis systems responsive to tire temperature as determined by the controller 106. In one embodiment, the controller 106 determines a tire temperature value directly via a sensor in one or more of the wheels for the tires 104. In other embodiments, the controller 106 determines a temperature value by processing data from various sensors in communication (144) with the controller. Examples of such sensors include intake air temperature sensors, coolant temperature sensors, tire pressure sensors, an engine OFF timer (that is, the elapsed time since the engine was last turned OFF, or Key Down) to name a few. In still other embodiments, determination of an initial (i.e., at start up) tire temperature value is made by an estimation process based upon vehicle operational data when direct tire temperature data is not available, or available sensor data is determined to be presently unreliable, such as at engine start (or Key Up).

In some embodiments, it is convenient to classify a determined tire temperature value into a plurality of states or ranges of tire temperature. These states may be varied by the vehicle design team according to vehicle type or the environment in which the vehicle will operate (for example, Arizona verses Minnesota). In fundamental embodiments, tire temperature may be classified into three states (for example: cold, normal and hot). Other embodiments prefer a five state classification as listed below in Table 1.

TABLE 1

| State Number | State Name | Temperature Range |
| --- | --- | --- |
| 0 | Frozen | 0 < −5 Celsius |
| 1 | Cold | −5 < 10 Celsius |
| 2 | Normal | 10 < 80 Celsius |
| 3 | Hot | 80 < 120 Celsius |
| 4 | Overheated | >120 Celsius |

Referring now to FIG. 2, there is shown a state diagram 200 that illustrates one exemplary embodiment for determining (or estimating) and classifying tire temperature and dynamically adjusting, calibrating or optimizing one or more active chassis systems responsive to such determination.

Beginning at Key Up (engine start), step 202 determines an initial estimation of a tire temperature value using vehicle operational data. This estimation is based upon inputs 204, which in one embodiment include coolant temperature, intake air temperature (IAT) and the elapsed time since the engine was last turned OFF (Key Down) from an engine OFF timer. Step 202 provides as outputs an initial tire temperature state estimate 206 and a validity indication 206' for the estimate. In one embodiment, this data is provided via the following process:

Read the Engine Off Timer
IF Engine Off Timer>=$Off_{Max}$ (for example, 240 minutes)
THEN
   Read $IAT_0$ (IAT at start up), $IAT_{Delay}$ (for example, start up+10 sec) and Coolant $Temp_0$ (Coolant temperature at startup).
   IF $IAT_0$<=Coolant Temp
   THEN (assume cold start) set Tire Temperature Estimate=Coolant $Temp_0$ and use Table 1 to determine Tire Temp State Estimate. Set Tire Temperature State Estimate Validity=1
   ELSE
      IF $IAT_{Delay}$<=Coolant Temp
      THEN (assume cold start and) set Tire Temperature Estimate=Coolant $Temp_0$ and use Table 1 to determine Tire Temp State Estimate. Set Tire Temperature State Estimate Validity=1
      ELSE set Tire Temperature Estimate=Coolant $Temp_0$, and use Table to determine Tire Temp State Estimate. Set Tire Temperature State Estimate Validity=1
ELSE
   IF (Engine Off Timer<=$Off_{Min}$ (for example, 2 min) AND $IAT_0$<=Coolant Temp) OR IF $IAT_{Delay}$<=Coolant Temp
   THEN set Tire Temperature Estimate=Coolant $Temp_0$, determine Tire Temp State Estimate from Table 1 and Tire Temperature State Estimate Validity=1
   ELSE (not enough information) set Tire Temperature Estimate=State 2 (normal) and Tire Temperature State Estimate Validity=0.

Step 202 thus provides an initial (at start up) estimate of tire temperature by using vehicle operating parameters. Also at Key Up, step 208 directly reads initial tire pressure and tire temperature and determines validity of the data. As is known, such data may be provided (input 210) from a conventional tire pressure monitor (TPM) associated with each tire being monitored. Typically, this data is measured for all tires, however, it is possible to use a sub-set of the total tires for any particular vehicle. If none of the data for the monitored tires is valid (as indicated by output 212), then tire temperature state determination must be initially made (step 214) with degraded data until valid data become available. However, if one or more of the monitored tires returns valid data, output 216 triggers data plausibility and validity determinations in step 218. In one embodiment, the data plausibility and validity determinations in step 218 are made via the following process:

Read TPM Sensor Temperature, TPM Sensor Temperature Validity (at monitored tires) (from step 208), Initial Tire Temp State Estimate and Initial Tire Temp State Estimate Validity (from step 202),
IF estimated data is available and valid (output 206),
THEN determine if actual initial tire temperature state and compare to initial tire temperature state estimate: Are they the same?
   Yes? data plausible. Pass data on for running plausibility checks.

No? Need to determine what data to trust if any—Need to determine mismatch between estimate to sensor measurements and pass the data on for running plausibility checks.

Mismatch of state 1 to 2
        Sensors read 1/estimate is 2—Choose 2
        Sensors read 2/estimate is 1—Choose 2
    Mismatch of state 2 to 3
        Sensors read 2/estimate is 3—Choose 2
        Sensors read 3/estimate is 2—Choose 2
    Mismatch of state 1 to 3—failed plausibility check—go to degraded state determination.

ELSE (Initial Tire Temp State Estimate is Invalid) Read $IAT_{Delay}$ and all valid tire temps. Are at least two tire temperatures in the same tire temperature range as the IAT?

Yes? Data is plausible. Pass on data for running plausibility checks.
    No? Choose the state based on the sensor reading (but not state 3 or 4).

An initial tire temperate state is thus determined if valid data is present. However, if the data is not valid and plausible, an initial tire temperature state is determined using what degraded inputs are available at start up in step 214. In one embodiments, such determination is made via the following process:

IF all four temp sensors are invalid OR all four tire temperatures are suspicious (from running plausibility checks)
THEN
    IF Initial Tire Temperature Estimate AND Initial Tire Temperature State available AND start up plausibility check is passed
    THEN use the Initial Tire Temperate Estimate to determine the state from Table 1.
        IF the initial tire temperature estimate>=Initial Tire Temperature Estimate State 1 and State 2−Estimated tire warmup (for example, 20 deg C.)<=Transition temperature between State 1 and State 2.
        THEN allow State 1 to be chosen.
        ELSE chose State 2 (don't allow State 3).
    ELSE choose State 2.
ELSE exit degraded mode and use state determined from Table 1 and perform plausibility checks.

The initial tire temperature state being now determined (from either step 214 or 218), one of the continuous monitoring states (step 220) is entered. Step 220 provides continuous monitoring of the tire pressure and tire temperature from the TPM sensor(s). Additionally, under various vehicle driving conditions, the IAT is filtered (averaged) as a measure outside ambient air temperature. This value is used in calculations used during the ongoing data plausibility checks that ultimately provide a valid and conditioned tire temperature value to the tire temperature state determination step (224), which in turn provides data to the various active chassis systems (e.g., 130-140 of FIG. 1) for adjustment thereof. The monitoring, calculation and plausibility checks of step 220 may be made via the following process.

IF Tire Temperature Sensor Data is Valid
THEN filter the sensor data for each wheel
    Determine the average filtered tire temperature based on the average of the filtered data on the rear axle. If either tire sensor is invalid or determined to be suspicious then average the remaining rear tire temperature with the highest temperature front tire. If both rear tire temperatures are invalid or suspicious, average the front tires. If only one front tire temperature is available, go to the degraded state (step 214). Pass this average filtered tire temperature to the state determination.

Plausibility Calculations:
1. Filter the IAT signal.
2. When the vehicle speed is greater than $vSpeed_{Filter}$ (for example, 31 kph) monitor the filtered IAT until stabilization is determined (for example, temperature fluctuations of +/−1 deg C. for more than 5000 ms). Set this to estimated air temperature. Continue this monitoring and continue to update. Only update this filtered IAT when the above conditions are met.
3. Calculate Vehicle Movement Timer. Increment the timer when the vehicle speed is greater than $vSpeed_{Timer}$ (for example, 31 kph). Pause the timer when the vehicle speed is less than $vSpeed_{Timer}$. Increment the timer until it achieves $Time_{Max}$ (for example, 1000 seconds)
4. For each valid tire temperature sensor, start a timer that counts up when the tire temperature or tire pressure is unchanged when the vehicle speed is greater than $vSpeed_{Timer}$. If the vehicle speed drops below $vSpeed_{Timer}$ then pause the timer. If the pressure or temperature changes, clear the timer. IF the Vehicle Movement Timer is less than $Time_{Max}$ and the timer on a given wheel counts up to greater than $Wheel_{Max}$ (for example, 300 sec) OR the Vehicle Movement Timer is $Time_{Max}$ and the timer on a given wheel is counts up to greater than $Time_{Max}$ THEN set tire temperature as suspicious.

Plausibility Check Based on Above Calculations:
IF average filtered tire temperature sensor<estimated air temperature+a temperature calibration (for example, 15 deg C.) OR two or more tire temperature sensors are valid OR (IF three or less tire temperatures are suspicious AND Tire temperature state is 1 or 2 AND Vehicle speed is greater than $vSpeed_{Plaus}$ (for example, 80 kph) AND longitudinal and lateral acceleration thresholds are not met (for example, 0.1 g's and 0.15 g's respectively) THEN hold the current state ELSE END) OR (average filtered Tire Temperature>temperature range to enter State 3 for more than 10 seconds and the Track Detect Counter is greater than 2;
THEN Data is plausible.
ELSE Data is not plausible, go to the degraded state (step 214).

The verified and conditioned tire temperature is received by the tire temperature state determination state (step 224). This state provides tire state determinations (226) to the various active chassis control systems (e.g., 130-140 of FIG. 1) for adjustment thereof. However, in addition to the measured tire temperature changing due to the normal operation of the vehicle and the environment, tire tread temperature may rapidly change should the driver of the vehicle exhibit aggressive driving habits. Accordingly, exemplary embodiments include an aggressive driving detector 232 that accepts as inputs (230) the current vehicle speed and lateral acceleration measurements and determines whether the vehicle operator is driving aggressively. One implementation of an aggressive driving detector is described in U.S. Pat. No. 6,408,229(b1), which is incorporated herein by reference. In the event aggressive driving is detected, a signal 234 is provided to steps 214, 220 and 224 causing the tire temperature state to be changed to State 3 without waiting for the measured or estimated tire temperature to rise due to the aggressive driving. This provides a rapid adjustment to the various active chassis systems for optimized performance during the period of aggressive driving. Upon determining that the aggressive driving has ended, normal operation of tire temperature determination resumes.

Figure 3:
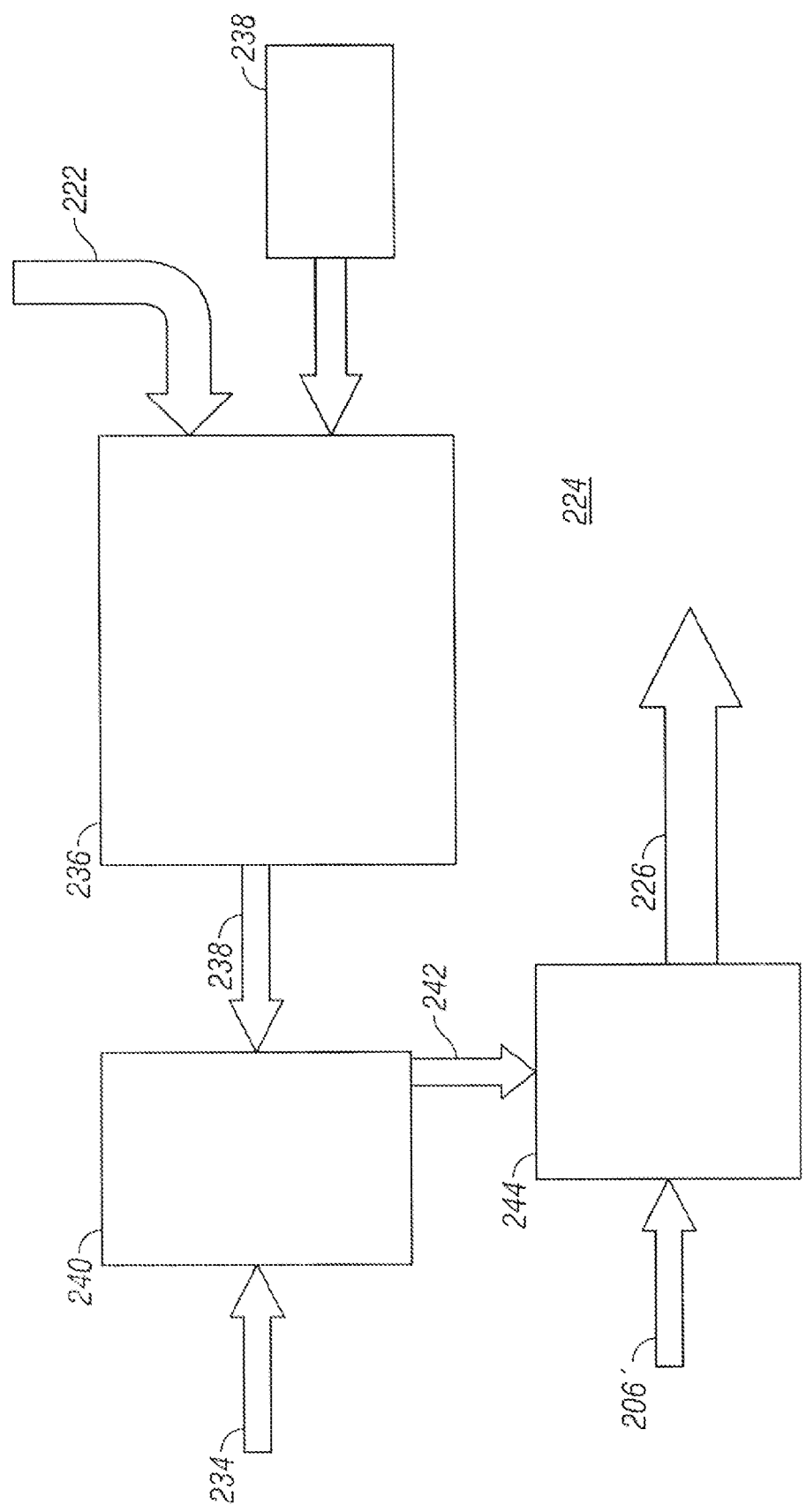
FIG. 3 is a state diagram illustrating the operation of a tire temperature state adjustment system for use in the active chassis control system of FIG. 2 according to exemplary embodiments.

Referring now to FIG. 3, there is shown a more detailed state diagram that illustrates one exemplary embodiment for classifying tire temperature state 224 for dynamically adjusting, calibrating or optimizing one or more active chassis systems responsive to such state determination.

Tire Temperature State changes are made in step 236, which accepts as inputs the verified tire temperatures 222 (from step 220 of FIG. 2) and the data of Table 1 (see above). In one embodiment, tire temperature state changes are made via the following process, but are prevented if any active chassis system is currently intervening in a dynamic driving situation:

Tire Temperature State Reduction:
If Tire Temperature<next lowest state temperature range Measured State=Measured State−1
Tire Temperature State Increase:
If Tire Temp>next highest state temperature range Measured State=Measured State+1
ELSE no state change.

The tire temperature state adjustments (if any) are passed (238) to step 240, which receives as a second input (234) the aggressive driving indication (from step 228 of FIG. 2). If little or no aggressive driving is exhibited, the state is limited to a maximum of State 2 which is passed (242) to the set the final tire temperature state in step 244. If some aggressive driving is exhibited then the adjusted or current state is passed directly to step 244. Step 244 is responsible for passing (226) the tire temperature state information that the active chassis systems (e.g., 130-140 of FIG. 1) will use to make adjustments for enhanced control and safety of the vehicle (100 of FIG. 1). If data validity (206') is good the tire temperature state passed (242) from step 240 is sent to the active chassis systems. If validity fails, then the degraded tire temperature state (from step 214 of FIG. 2) is sent to the active chassis systems.

Accordingly, an active chassis system controlling braking, power applied or control inputs to the tires based upon tire temperature is provided for a vehicle that is optimized for vehicle performance and safety over the entire operating temperature range of the tires. Additionally, the system rapidly responds to aggressive driving habits in anticipation of rapid tire tread temperature increase.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing summary and detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. In a vehicle having at least one tire and an electronic control system, a method, comprising:
    determining, by the electronic control system, a tire temperature value for the at least one tire of the vehicle using at least one sensor;
    classifying, by the electronic control system, the tire temperature value into one of a plurality of predetermined temperature ranges to provide a tire temperature state;
    changing the tire temperature state responsive to the electronic control system detecting aggressive driving of the vehicle based upon monitoring vehicle speed and lateral acceleration; and
    adjusting, by the electronic control system, at least one active chassis system of the vehicle responsive to the tire temperature value.

2. The method of claim 1, wherein adjusting further comprises the electronic control system adjusting the at least one active chassis system of the following group of active chassis systems:
    antilock breaking system;
    traction control system;
    electronic stability control;
    electronic all-wheel drive system;
    electronically controlled front, center and rear driveline coupling;
    electronic power steering system;
    electronic suspension system;
responsive to the tire temperature value.

3. The method of claim 1, wherein determining comprises initially estimating the tire temperature value via the electronic control system receiving data from the at least one sensor.

4. The method of claim 1, which includes the electronic control system making a determination of initial tire temperature value using vehicle parameters of intake air temperature, coolant temperature and engine off time.

5. The method of claim 4, where determining the tire temperature valve comprises the electronic control system comparing the initial tire temperature value to tire temperature data from a tire pressure monitor.

6. The method of claim 5, which includes the electronic control system selecting a default tire temperature value if the initial tire temperature value and tire temperature data from the tire pressure monitor do not match.

7. In a vehicle having at least one tire and a controller, a method, comprising:
    determining, by the controller, an initial tire temperature estimate for at least one tire of a vehicle using operating parameters of a vehicle;
    measuring an initial tire temperature value from at least one sensor;
    determining, by the controller, validity of the initial tire temperature estimate and initial tire temperature value;
    determining, by the controller, a tire temperature state from the initial tire temperature estimate and by classifying the initial tire temperature value into one of a plurality of predetermined temperature ranges when validity is determined and classifying the tire temperature value into one of a plurality of predetermined temperature ranges to provide the tire temperature state;
    selecting, by the controller, a default value for the tire temperature state when validity of the initial tire temperature estimate and initial tire temperature value is not determined;
    changing the tire temperature state responsive to the electronic control system detecting aggressive driving of the vehicle based upon monitoring vehicle speed and lateral acceleration; and
    adjusting, by the controller, at least one active chassis system of the vehicle responsive to the tire temperature state.

8. The method of claim 7, wherein adjusting further comprises the controller adjusting the at least one active chassis system of the following group of active chassis systems:
   antilock breaking system;
   traction control system;
   electronic stability control;
   electronic all-wheel drive system;
   electronically controlled front, center and rear driveline coupling;
   electronic power steering system;
   electronic suspension system;
responsive to the tire temperature state.

9. The method of claim 7, wherein classifying the tire temperature value into one of the plurality of predetermined temperature comprises the controller classifying the tire temperature value into one of the following group of tire temperature states: cold, normal or hot.

10. A vehicle, comprising:
   a chassis having an engine providing power to tires to propel the vehicle;
      at least one active chassis system configured to control braking, power applied or control inputs to the tires; and
      a controller coupled to the engine and the at least one active chassis system and configured to determine a tire temperature state for adjusting the at least one active chassis system by classifying the tire temperature value into one of a plurality of predetermined temperature ranges, the controller further configured to change the tire temperature state responsive to detecting aggressive driving of the vehicle based upon monitoring vehicle speed and lateral acceleration;
      wherein the at least one active chassis systems are adjusted responsive to the tire temperature state to control the braking, power applied or control inputs to the tires;
   a chassis having an engine providing power to tires to propel the vehicle;
      at least one active chassis system configured to control braking, power applied or control inputs to the tires; and
      a controller coupled to the engine and the at least one active chassis system and configured to determine a tire temperature state for adjusting the at least one active chassis system by classifying the tire temperature value into one of a plurality of predetermined temperature ranges;
      wherein the at least one active chassis systems are adjusted responsive to the tire temperature state to control the braking, power applied or control inputs to the tires.

11. The vehicle of claim 10, wherein the at least one active chassis system comprises one or more of the following group of active chassis system: antilock breaking system; traction control system; electronic stability control; electronic all-wheel drive system; electronically controlled front, center and rear driveline coupling; electronic power steering; or electronic suspension systems.

12. The vehicle of claim 10, wherein the tire temperature value is classified into one of the following plurality of predetermined tire temperature states: cold, normal or hot.

13. The vehicle of claim 10, wherein the controller is further configured to determine validity of the tire temperature value and select a default tire temperature value when the tire temperature value is determined not to be valid.

* * * * *